US007895108B2

(12) United States Patent
Eimbinder

(10) Patent No.: US 7,895,108 B2
(45) Date of Patent: Feb. 22, 2011

(54) METHOD AND SYSTEM FOR MANAGING COLLATERALIZED OBLIGATIONS TO SATISFY PREDETERMINED INVESTMENT RATINGS REQUIREMENTS

(75) Inventor: Richard Eimbinder, Tenafly, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 100 days.

(21) Appl. No.: 11/653,075

(22) Filed: Jan. 12, 2007

(65) Prior Publication Data
US 2007/0168272 A1 Jul. 19, 2007

Related U.S. Application Data

(60) Provisional application No. 60/759,239, filed on Jan. 13, 2006.

(51) Int. Cl.
*G06Q 40/00* (2006.01)
(52) U.S. Cl. .......................... 705/36 R; 705/35; 705/37
(58) Field of Classification Search ............... 705/36 R, 705/35
See application file for complete search history.

(56) References Cited

U.S. PATENT DOCUMENTS
2006/0143532 A1* 6/2006 Andreev et al. ............... 714/38

OTHER PUBLICATIONS

Proceedings of the 2004 Winter Simulation Conference R .G. Ingalls, M. D. Rossetti, J. S. Smith, and B. A. Peters, eds. Portfolio Credit Risk Analysis Involving CDO Tranches Menghui Cao.*
"CDO evaluator and portfolio benchmarks" by Sten Bergman. Dec. 2005 http://docs.google.com/viewer?a=v&q=cache:jwITEC5JCAgJ:www2.standardandpoors.com/spf/pdf/fixedincome/121905_CDO_e3_assumptionsSNAP.pdf+s%26p+cdo+evaluator&hl=en&gl=us&pid=bl&srcid=ADGEESgXNJEMVUP-FCfcAncf2nhwo7WhAJDYpIdV9X_3ioEJwQfIDs2u0qA0j7N9pvCZu_DNa7MYzUk8Lz4qlkMDIttpEBEluwazY60.*
CDO Evaluator Version 3.0: Technical Document Standard & Poor's Dec. 19, 2005.*

* cited by examiner

*Primary Examiner*—James A Kramer
*Assistant Examiner*—James A Vezeris
(74) *Attorney, Agent, or Firm*—Lowenstein Sandler PC

(57) ABSTRACT

A method and system are provided which generate a collateral quality formula, based on a data set of collateral quality values, used to guide purchases and sales of collateral by CDO managers to satisfy investment ratings requirements, such as those established by independent ratings services, such as, for example, Moody's Investors Service, without having to adhere to the more limited defined parameters of a collateral quality value matrix.

9 Claims, 3 Drawing Sheets

|  | Weighted Average Margin | Diversity Score | Moody's Weighted Average Recovery Rate | Moody's Weighted Average Rating |
|---|---|---|---|---|
| 1 | 230 | 50 | 45.25 | 2,260 |
| 2 | 220 | 45 | 43.25 | 2,090 |
| 3 | 265 | 45 | 43.25 | 2,300 |
| 4 | 280 | 50 | 43.25 | 2,420 |
| 5 | 245 | 55 | 43.25 | 2,315 |
| 6 | 225 | 60 | 43.25 | 2,210 |
| 7 | 220 | 65 | 43.25 | 2,200 |
| 8 | 225 | 45 | 43.50 | 2,135 |
| 9 | 275 | 45 | 43.50 | 2,335 |
| 10 | 240 | 50 | 43.50 | 2,265 |
| 11 | 290 | 50 | 43.50 | 2,460 |
| 12 | 255 | 55 | 43.50 | 2,395 |
| 13 | 240 | 60 | 43.50 | 2,325 |
| 14 | 240 | 65 | 43.50 | 2,350 |
| 15 | 245 | 45 | 43.75 | 2,250 |
| 16 | 295 | 45 | 43.75 | 2,425 |
| 17 | 260 | 50 | 43.75 | 2,380 |
| 18 | 230 | 55 | 43.75 | 2,245 |
| 19 | 220 | 60 | 43.75 | 2,205 |
| 20 | 220 | 65 | 43.75 | 2,230 |
| 21 | 225 | 45 | 44.00 | 2,155 |
| 22 | 275 | 45 | 44.00 | 2,360 |
| 23 | 240 | 50 | 44.00 | 2,290 |
| 24 | 290 | 50 | 44.00 | 2,490 |
| 25 | 300 | 45 | 43.25 | 2,420 |
| 26 | 260 | 60 | 44.00 | 2,485 |
| 27 | 225 | 45 | 44.25 | 2,185 |
| 28 | 275 | 45 | 44.25 | 2,375 |
| 29 | 240 | 50 | 44.25 | 2,310 |
| 30 | 220 | 55 | 44.25 | 2,210 |
| 31 | 220 | 60 | 44.25 | 2,235 |
| 32 | 225 | 65 | 44.25 | 2,290 |
| 33 | 235 | 45 | 44.50 | 2,250 |
| 34 | 285 | 45 | 44.50 | 2,430 |
| 35 | 250 | 50 | 44.50 | 2,380 |
| 36 | 235 | 55 | 44.50 | 2,325 |
| 37 | 235 | 60 | 44.50 | 2,345 |
| 38 | 245 | 65 | 44.50 | 2,440 |
| 39 | 260 | 45 | 44.75 | 2,345 |
| 40 | 225 | 50 | 44.75 | 2,245 |
| 41 | 275 | 50 | 44.75 | 2,475 |

Fig. 2

| | Weighted Average Margin | Diversity Score | Moody's Weighted Average Recovery Rate | Moody's Weighted Average Rating |
|---|---|---|---|---|
| 42 | 260 | 55 | 44.75 | 2,495 |
| 43 | 225 | 65 | 44.75 | 2,330 |
| 44 | 240 | 45 | 45.00 | 2,300 |
| 45 | 290 | 45 | 45.00 | 2,465 |
| 46 | 255 | 50 | 45.00 | 2,420 |
| 47 | 245 | 55 | 45.00 | 2,425 |
| 48 | 220 | 65 | 45.00 | 2,305 |
| 49 | 240 | 45 | 45.25 | 2,310 |
| 50 | 290 | 45 | 45.25 | 2,475 |
| 51 | 260 | 50 | 45.25 | 2,450 |
| 52 | 220 | 60 | 45.25 | 2,295 |
| 53 | 235 | 65 | 45.25 | 2,420 |
| 54 | 255 | 45 | 45.50 | 2,370 |
| 55 | 230 | 50 | 45.50 | 2,330 |
| 56 | 230 | 55 | 45.50 | 2,350 |
| 57 | 245 | 60 | 45.50 | 2,490 |
| 58 | 240 | 45 | 45.75 | 2,330 |
| 59 | 220 | 50 | 45.75 | 2,260 |
| 60 | 220 | 55 | 45.75 | 2,305 |
| 61 | 235 | 60 | 45.75 | 2,430 |
| 62 | 230 | 45 | 46.00 | 2,315 |
| 63 | 280 | 45 | 46.00 | 2,485 |
| 64 | 260 | 50 | 46.00 | 2,490 |
| 65 | 235 | 60 | 46.00 | 2,445 |
| 66 | 240 | 45 | 46.25 | 2,355 |
| 67 | 225 | 50 | 46.25 | 2,350 |
| 68 | 235 | 55 | 46.25 | 2,440 |
| 69 | 220 | 45 | 46.50 | 2,295 |
| 70 | 270 | 45 | 46.50 | 2,475 |
| 71 | 265 | 60 | 43.75 | 2,500 |
| 72 | 230 | 65 | 46.50 | 2,475 |
| 73 | 265 | 45 | 46.75 | 2,475 |
| 74 | 225 | 55 | 46.75 | 2,415 |
| 75 | 225 | 45 | 47.00 | 2,345 |
| 76 | 225 | 50 | 47.00 | 2,390 |
| 77 | 225 | 60 | 47.00 | 2,450 |
| 78 | 250 | 45 | 47.25 | 2,455 |
| 79 | 225 | 55 | 47.25 | 2,450 |
| 80 | 220 | 65 | 47.50 | 2,480 |

Fig. 2 (cont'd)

METHOD AND SYSTEM FOR MANAGING COLLATERALIZED OBLIGATIONS TO SATISFY PREDETERMINED INVESTMENT RATINGS REQUIREMENTS

CROSS REFERENCE TO RELATED PROVISIONAL APPLICATION

This application claims the benefit of U.S. Provisional Patent Application No. 60/759,239 filed on Jan. 13, 2006, the disclosure of which is incorporated herein by reference in its entirety.

BACKGROUND OF THE INVENTION

The present invention generally relates to a new method and system for managing securitized interests in pools of collateral, such as, for example, collateralized debt obligations ("CDOs"), to satisfy portfolio investment ratings requirements.

Investors generally use independent ratings from ratings services, such as, for example, Moody's Investors Service ("Moody's"), to help price credit risk of securities they may purchase or sell. Many also use ratings as limits on their investment parameters and as means for expanding their investment horizons to markets or security types they do not cover by their own analyses. Because investors globally rely on ratings, the ratings help to provide issuers of debt with stable, flexible access to those sources of capital.

Any type of debt or related obligation of interest to institutional investors can be rated, e.g., bonds, debentures, asset-backed and mortgage-backed securities, convertible bonds, medium-term notes, derivative securities, etc. While the present disclosure utilizes the example of CDOs, which, as described in greater detail hereinafter, are securitized interests in pools of (generally non-mortgage) assets, it should be appreciate that the present invention is not limited to CDOs but has application with respect to other types of securitized interests as well.

Conventionally, managers of CDOs structure the underlying collateral such that the CDO will satisfy certain collateral quality requirements established by an independent ratings service, such as, for example, Moody's (e.g., Moody's Diversity Score Test, Minimum Average Recovery Rate Test, Weighted Average Rating Factor Test and Weighted Average Margin Test), which requirements can be represented in the form of a collateral quality matrix ("Matrix"), to, in turn, meet the requirements of a particular ratings category (which ratings, for Moody's system of gradation, range from C (the lowest) to Aaa (the highest)). An abbreviated (showing only six rows) example of a Moody's Matrix is set forth below in Table 1.

TABLE 1

| Row | Diversity | Recovery | WARF | Margin |
|---|---|---|---|---|
| 1 | 40 | 44.23 | 2,070 | 235 |
| 2 | 40 | 44.23 | 2,300 | 300 |
| 3 | 45 | 44.23 | 2,165 | 235 |
| 4 | 45 | 44.23 | 2,300 | 275 |
| 5 | 40 | 44.48 | 2,300 | 295 |
| 6 | 45 | 44.48 | 2,385 | 295 |

Diversity refers to the diversity score required to satisfy the Diversity Score Test developed by Moody's for CDO risk analysis. The diversity score of a given pool of participations (debt instruments of various obligors) is the number n of collateral (e.g., bonds) in an idealized comparison portfolio where (i) the total face value of the comparison portfolio is the same as the total face value of the collateral pool; (ii) the collateral of the comparison portfolio have equal face values; (iii) the comprarison collateral are equally likely to default (independently); (iv) the comparison collateral have the same average default probability as the participations of the collateral pool; and (v) the comparison portfolio has the same total loss risk as the collateral pool.

Recovery refers to the minimum average recovery rate required to satisfy the Minimum Average Recovery Rate Test of Moody's. It is a measure of the fraction of an exposure that may be recovered through bankruptcy proceedings or some other form of settlement in the event of a default. Recovery rate assumptions are based, generally, on historical recovery rates for loans and bonds.

WARF refers to the weighted average rating factor required to satisfy the Weighted Average Rating Factor Test of Moody's. It is a numerical measure relating to Moody's system of gradation by which relative credit worthiness is represented (e.g., portfolio collateral issued or guaranteed by the United States government might be assigned a Moody's Rating Factor of 1 which corresponds to the Aaa Moody's rating category).

Margin refers to the weighted average margin (in bps) required to satisfy the Weighted Average Margin Test of Moody's. It is a measure of the difference between market value and face value of collateral.

A disadvantage associated with the Matrix is that it offers the CDO manager only limited flexibility in purchasing and selling collateral to satisfy ratings requirements. The present invention fills this gap by providing a method and system for a CDO manager to satisfy portfolio investment ratings requirements without having to adhere to the strict parameters of the Matrix.

SUMMARY OF THE INVENTION

Generally speaking, a new method and system for managing securitized interests in pools of assets, such as, for example, CDOs, provide the user with a dynamic tool for satisfying portfolio investment ratings requirements such as those established by Moody's, for example.

In accordance with a preferred embodiment of the present invention, collateral quality values, such as for Diversity Score, Weighted Average Recovery Rate, Weighted Average Rating Factor and Weighted Average Margin, are determined to satisfy the requirements of a particular ratings (e.g., Moody's) category, and a correlation/regression analysis is performed using suitable known techniques (which can be effected via known computer correlation/regression algorithms) to yield a mathematical relationship that can be used by the CDO manager to guide purchases and sales of collateral such that the CDO meets the requirements of the particular ratings category.

The foregoing and other aspects, features and advantages of the invention will in part be obvious and will in part be apparent from this disclosure and the accompanying drawings.

The present invention accordingly comprises the features of construction, and combination and arrangement of elements, as well as the several steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the present invention, reference is had to the following description taken in connection with the accompanying drawings, in which:

FIG. 2 is a practical example of a Matrix of various combinations of collateral quality values that satisfy requirements for a particular investment ratings category used in accordance with a preferred embodiment of the method and system of the present invention.

DETAILED DESCRIPTION OF THE PREFERRED EMBODIMENTS

Figure 1:
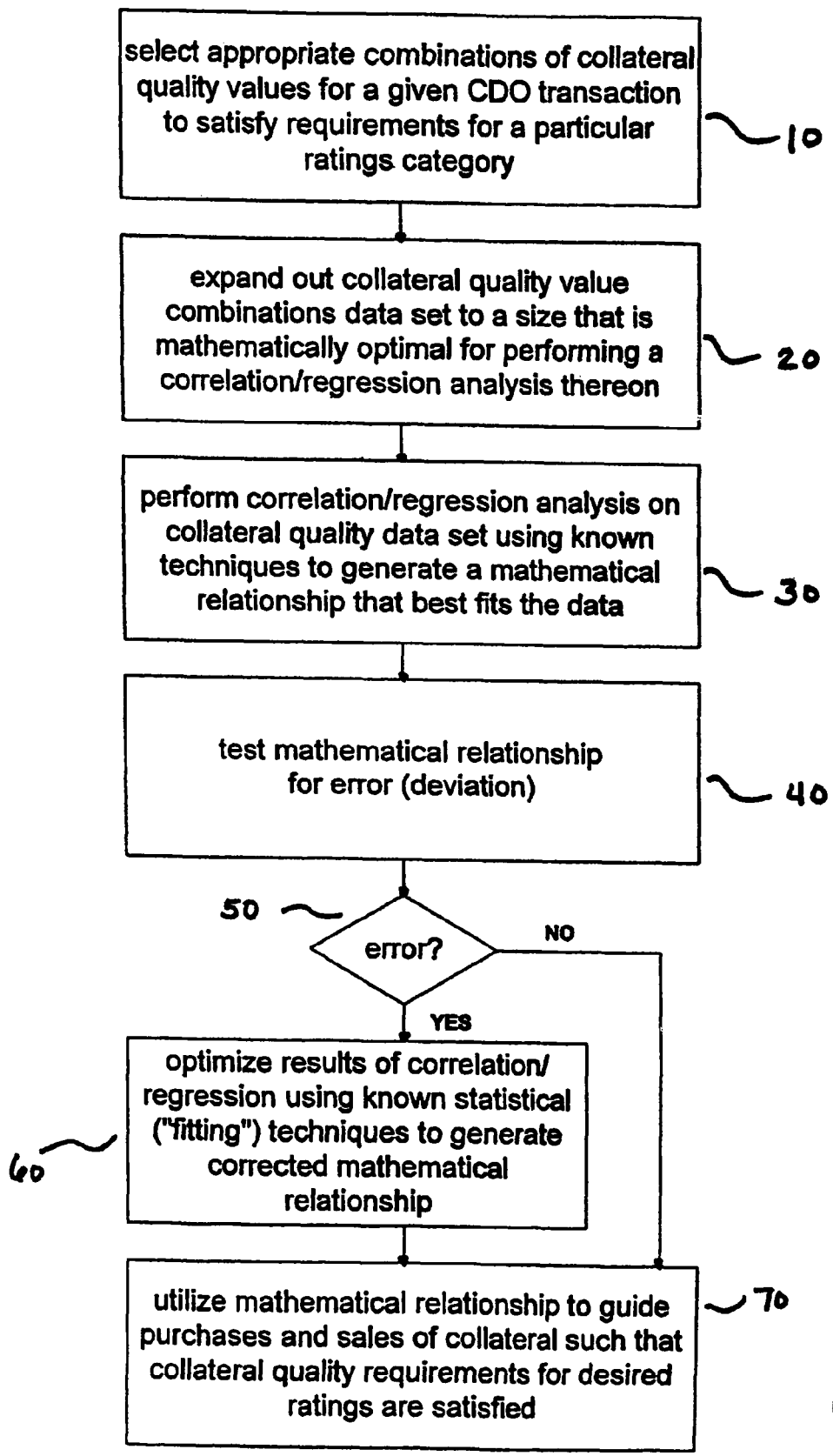
FIG. 1 is a flow diagram illustrating process steps for implementing a method and system for managing securitized interests in pools of assets to satisfy independent portfolio investment ratings requirements according to a preferred embodiment of the present invention.

CDOs allow investors to share the risk and return of an underlying pool of collateral (e.g., bonds or loans or a combination of these). A CDO may be identified as a collateralized loan obligation ("CLO") or a collateralized bond obligation ("CBO") if it holds only loans or bonds, respectively. Investors bear the credit risk of the collateral. CDOs are appealing to investors because of the attractive yields they offer.

Typically, a CDO has one or more sponsoring organizations which establish(es) a special purpose vehicle to acquire the collateral and fund the acquisition by issuing notes to investors. Sponsoring organizations can include banks, other financial institutions or investment managers.

CDOs are structured such that there is a "purchaser" and "seller" of credit protection on a specified portfolio. The CDO investors are the "sellers" and the sponsoring organizations are the "purchasers."

The notes issued to investors are "tranched"—offering investors various maturity and credit risk characteristics. Tranches are typically categorized as "senior," "mezzanine" and "subordinated/equity" according to their degree of credit risk. If there are defaults or the CDO's collateral otherwise underperforms, scheduled payments to senior tranches take precedence over those of mezzanine tranches, and scheduled payments to mezzanine tranches take precedence over those to subordinated/equity tranches. Moody's, for example, rates senior and mezzanine tranches—reflecting both the credit quality of underlying collateral as well as how much protection a given tranch is afforded by tranches that are subordinate to it. Often, the sponsoring organization(s) retain(s) the most subordinate equity tranch of a CDO.

A variety of different instruments can be categorized together under the term "CDO". Some of the different structures are discussed below.

One distinction is that between "static" and "managed" deals. With the former, collateral is fixed through the life of the CDO. Investors can assess the various tranches of the CDO with full knowledge of what the collateral will be. The primary risk they face is credit risk. With a managed CDO, a portfolio manager is appointed to actively manage the collateral of the CDO. The life of a managed deal can generally be divided into three phases:

(1) ramp-up (which typically lasts about a year) during which the portfolio manager initially invests the proceeds from the issuance of notes to investors;

(2) the reinvestment or "revolver" period (which typically lasts five or more years) during which the manager actively manages the CDO's collateral, reinvesting cash flows as well as purchasing and selling assets;

(3) the final period where collateral matures or is sold, and investors are paid off.

At the time of initial investment, investors in a managed deal typically do not know in what specific assets the CDO manager will invest, and those assets will change over time. All that investors may know is the identity of the portfolio manger and the investment guidelines under which the manager will work. Today, most CDOs are managed deals. In many cases, portfolio management is carried out by a sponsoring organization.

CDOs can be structured as cash-flow or market-value deals. Cash flows from collateral are used to pay principal and interest to investors. If cash flows prove inadequate, principal and interest are paid to tranches according to seniority. With a market value deal, principal and interest payments to investors come from both collateral cash flows as well as sales of collateral. Payments to tranches are not contingent on the adequacy of the collateral's cash flows, but rather the adequacy of its market value.

Another distinction is that between balance sheet CDOs and arbitrage CDOs. These names correspond to respective motivations of the sponsoring organization(s). With a balance sheet deal, the sponsoring organization is a bank or other institution that holds (or anticipates acquiring) loans or debt that it wants to remove from its balance sheet. Arbitrage deals are motivated by the opportunity to add value by repackaging collateral into tranches. In finance, the "Law of One Price" suggests that the securities of a CDO should have the same market value as its underlying collateral. In practice, this is often not the case. Accordingly, a CDO can represent a theoretical arbitrage.

Much of the arbitrage in a CDO arises from a persistent market imperfection related to the somewhat arbitrary distinction between investment grade and junk debt. Many institutional investors face limits on their ability to hold below-investment-grade debt. This can take the form of regulations, capital requirements and/or investment restrictions imposed by management. As a result, junk often trades at spreads to investment grade debt that are wider than might be explained purely by credit risk considerations. With a CDO, a portfolio of below-investment-grade debt can be repackaged into tranches, some of which receive investment grade, and even Aaa, ratings.

It should be appreciated from the foregoing that CDOs are mostly about repackaging and transferring credit risk. While it is possible to issue a CDO backed entirely by high quality bonds, the structure is more relevant for collateral comprised partly or entirely of marginal obligations.

This leads to another distinction—that between "cash" and "synthetic" CDOs. Cash CDOs, the CDO type generally discussed above, expose investors to credit risk by holding collateral that is subject to default. By comparison, a synthetic deal holds high quality or cash collateral that has little or no default risk. It exposes investors to credit risk by adding credit default swaps to the collateral. Synthetic CDOs can be static or managed. They can be balance sheet or arbitrage transactions.

In conventional managed CDOs, managers typically structure the underlying collateral such that the CDO will satisfy specific collateral quality requirements approved by an independent ratings agency, such as, for example, Moody's. In so doing, a Matrix is typically generated for a given CDO (e.g., Moody's Diversity Score Test, Weighted Average Recovery Rate Test, Rated Average Rating Factor Test and Weighted Average Margin Test) that will, in turn, meet the requirements of a particular ratings (e.g., Moody's) category.

The method and system according to the present invention provide a dynamic alternative to the static combinations of collateral quality requirements of the Matrix in the form of a formula which affords the CDO manager sufficient flexibility in purchasing and selling collateral to satisfy the desired ratings requirements with respect to a particular CDO.

Referring now to drawing FIG. 1, in accordance with a preferred embodiment of the present invention, combinations of collateral quality values, e.g., for Diversity Score, Weighted Average Recovery Rate, Weighted Average Rating Factor and Weighted Average Margin, are determined (e.g., by the CDO manager preferably in consultation with Moody's or other independent ratings agency) in known manner to satisfy the requirements for a particular ratings category. (See FIG. 1, step 10). Such combinations of collateral quality values form the basis for a Matrix for the given CDO.

The Matrix is then expanded out, as necessary, to a size that is mathematically optimal for performing a correlation/regression analysis on the collateral quality data set—preferably, the Matrix is expanded out to about one thousand rows of collateral quality data combinations. (See FIG. 1, step 20).

A correlation/regression analysis is then performed on the collateral quality data set using suitable known statistical correlation/regression techniques (which can be effected via known computer algorithms—e.g., Microsoft Corporation's Excel software program) to generate a mathematical relationship that best fits the data. (See FIG. 1, step 30). The mathematical relationship can then be used by the CDO manager in lieu of the Matrix to guide purchases and sales of collateral such that the CDO meets the collateral quality requirements that will earn it the desired Moody's rating. (See FIG. 1, step 70).

The correlation/regression analysis involves determining the values of parameters for a function that cause the function to best fit the given data set. For example, in linear regression, the function is a linear (straight-line) equation.

The correlation/regression analysis is more than curve fitting (choosing a curve that best fits given data points)—it involves fitting a model with both deterministic and stochastic components. The correlation/regression analysis performed will determine the best values for the given parameters.

For such an analysis a data file containing the values of the dependent and independent variables is provided. In the present invention, each data record preferably contains combinations of values, e.g., for Diversity Score, Weighted Average Recovery Rate, Weighted Average Rating Factor and Weighted Average Margin.

Correlation/regression can be expressed as a maximum likelihood method of estimating the parameters of a model. However, for small amounts of data, this estimate can have high variance. Accordingly, the more selections provided, the more accurate the estimate of the parameters. Hence, it is preferred to fill the data set with as many collateral quality combinations as possible (e.g., 1,000 is optimal).

If a perfect fit existed between the relationship generated as a result of the correlation/regression analysis and the actual data, each collateral quality combination of values input into the generated relationship would exactly equal the predicted value. However, this may not be the case, and the difference between the actual value and the predicted value for a collateral quality combination is the error of the estimate or "deviation". (See FIG. 1, step 40 and decision 50). In such circumstances, it is desirable that the results of the correlation/regression analysis on the collateral quality data set be optimized using suitable known statistical "fitting" techniques. (See FIG. 1, step 60).

Correlation/regression is usually posed as an optimization problem aimed at finding a solution where the error is at a minimum. The most common error measure that is used is the least squares—this corresponds to a Gaussian likelihood of generating observed data. The optimization problem can typically be solved by the use of algorithms such as, for example, gradient descent algorithms, the Gauss-Newton algorithm, and the Levenberg-Marquardt algorithm. Probabilistic algorithms can also be used to find a good fit for a data set.

Referring now to drawing FIG. 2, there is shown a practical example of a Matrix of the type contemplated for use in accordance with the preferred embodiment of the method and system of the present invention, and which could be presented in an indenture. An Indenture is a written contract, also known as a "Deed of Trust", under which notes are issued to investors, setting forth maturity date, interest rate, redemption rights and other terms. Under the rules of the Trust Indenture Act of 1939, the contract is executed by the issuer and a trustee who acts on behalf of the noteholders.

FIG. 2 sets forth, in Matrix form, various combinations of collateral quality values (i.e., Diversity Score, Weighted Average Recovery Rate, Weighted Average Rating and Weighted Average Margin) determined by the CDO manager, preferably in consultation with the relevant ratings agency (e.g., Moody's), in known manner to satisfy the requirements for a particular ratings category for the given CDO collateral. In accordance with the method and system of the preferred embodiment of the present invention, this Matrix is expanded out, as necessary, to a size (desirably, beyond the 80 rows shown in FIG. 2) that is mathematically optimal for performing a correlation/regression analysis on the collateral quality data set.

The correlation/regression analysis is then performed on the collateral quality data set and any necessary post-correlation/regression statistical optimization "fitting" techniques are applied to the results. This yields the following mathematical relationship that best fits the data:

Diversity Score Test:
lesser of 65 and the Diversity Score, but in no event less than 45

Minimum Average Recovery Rate Test:
lesser of 47.50% and Moody's Weighted Average Recovery Rate, but in no event less than 43.25%

Weighted Average Rating Factor Test:
greater of 2090 and Moody's Weighted Average Rating, but in no event greater than 2500

Weighted Average Margin Test:
greater of 2.20% (or 220 bps) and an amount equal to:
241.98+[−2 (Diversity Score−52.5)]−[12.228 (Weighted Average Recovery Rate−44.930210918)]+[0.203 (Weighted Average Rating−2370.2357)]+[0.094 (Diversity Score−52.5)$^2$]−[0.0069 ((Weighted Average Rating−2370.2357) (Diversity Score−52.5))]+[0.2909 ((Diversity Score−52.5) (Weighted Average Recovery Rate−44.930210918))]

The generated mathematical relationship can then be used by the CDO manager in lieu of the Matrix to guide purchases and sales of collateral such that the CDO meets the collateral quality requirements that will earn it the desired rating. It should be appreciated that the generated formula affords the CDO manager greater flexibility in purchasing and selling collateral to satisfy the desired ratings requirements than does the Matrix.

The present invention can be implemented using a related combination of automated interfaces and manual processes. It should be appreciated, however, that greater use of automated processing and a wider range of features with multiple executions is also contemplated by the present invention.

In so far as embodiments of the invention described herein are implemented, at least in part, using software controlled programmable processing devices, such as a computer system, it will be appreciated that one or more computer programs for configuring such programmable devices or system of devices to implement the foregoing described inventive method and system are to be considered an aspect of the present invention. The computer programs can be embodied as source code and undergo compilation for implementation on processing devices or a system of devices, or can be embodied as object code, for example. Those of ordinary skill in the art will readily understand that the term computer in its most general sense encompasses programmable devices such as those referred to above, and data processing apparatus, computer systems and the like. Preferably, the computer programs are stored on carrier media in machine or device readable form, for example in solid-state memory or magnetic memory such as disk or tape, and processing devices utilize the programs or parts thereof to configure themselves for operation.

It should be appreciated that the aspects, features and advantages made apparent from the foregoing and the accompanying drawings are efficiently attained and, since certain changes may be made in the disclosed constructions and processes without departing from the spirit and scope of the invention, it is intended that all matter contained herein and in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer implemented method for managing a collateralized obligation by the computer to satisfy investment ratings requirements, comprising the steps of:
    determining, by the computer, at least one combination of values of quality data factors associated with collateral to satisfy requirements for a preselected investment ratings category for a collateralized obligation including said collateral, said collateral quality data factors cocuprising a diversity score, a minimum average recovery rate, a weighted average rating factor, and a weighted average margin, said at least one combination of values of collateral quality data factors forming a basis for a matrix of values of collateral quality data factors;
    expanding, by the computer, said matrix to a size mathematically suitable for performing a correlation/regression analysis on said values of collateral quality data factors;
    performing, by the computer, a correlation/regression analysis on said values of collateral quality data factors to generate a mathematical relationship that best fits said values of collateral quality data factors; wherein said mathematical relationship comprises a plurality of tests for determining a necessary range of values for each of said collateral quality data factors to satisfy said requirements for said preselected investment ratings category; and
    using, by the computer, said mathematical relationship in lieu of said matrix to guide at least one of purchases and sales of said collateral such that said collateralized obligation satisfies said requirements for said preselected investment ratings category.

2. The method according to claim 1, further comprising the steps of testing said mathematical relationship for error, and when an error is present optimizing results of said correlation/regression analysis by statistical fitting.

3. The method according to claim 2, wherein said statistical fitting is effected using at least one of a gradient descent algorithm, the Gauss-Newton algorithm, the Levenberg-Marquardt algorithm, and a probabilistic algorithm.

4. A system for managing a collateralized obligation to satisfy investment ratings requirements comprising:
    a computer configured to determine at least one combination of values of quality data factors associated with collateral to satisfy requirements for a preselected investment ratings category for a collateralized obligation including said collateral, said collateral quality data factors comprising a diversity score, a minimum average recovery rate, a weighted average rating factor, and a weighted average margin, said at least one combination of values of collateral quality data factors forming a basis for a matrix of values of collateral quality data factors;
    the computer configured to expand said matrix to a size mathematically suitable for performing a correlation/regression analysis on said values of collateral quality data factors;
    the computer configured to perform a correlation/regression analysis on said values of collateral quality data factors to generate a mathematical relationship that best fits said values of collateral quality data factors, wherein said mathematical relationship comprises a plurality of tests for determining a necessary range of values for each of said collateral quality data factors to satisfy said requirements for said preselected investment ratings category; and
    the computer configured to guide at least one of purchases and sales of said collateral using said mathematical relationship in lieu of said matrix such that said collateralized obligation satisfies said requirements for said preselected investment ratings category.

5. The system according to claim 4, wherein the computer is further configured to test said mathematical relationship for errors and optimize results of said correlation/regression analysis by statistical fitting when an error is present.

6. The system according to claim 5, wherein said statistical fitting is effected using at least one of a gradient descent algorithm, the Gauss-Newton algorithm, the Levenberg-Marquardt algorithm, and a probabilistic algorithm.

7. A computer usable medium having a plurality of instructions, the plurality of instructions including instructions which, when executed by a processor, cause the processor to perform the steps of a method for managing a collateralized obligation to satisfy investment ratings requirements, said method comprising the steps of:
    determining at least one combination of values of quality data factors associated with collateral to satisfy requirements for a preselected investment ratings category for a collateralized obligation including said collateral, said collateral quality data factors comprising a diversity score, a minimum average recovery rate, a weighted average rating factor, and a weighted average margin, said at least one combination of values of collateral quality data factors forming a basis for a matrix of values of collateral quality data factors;

expanding said matrix to a size mathematically suitable for performing a correlation/regression analysis on said values of collateral quality data factors;

performing a correlation/regression analysis on said values of collateral quality data factors to generate a mathematical relationship that best fits said values of collateral quality data factors; wherein said mathematical relationship comprises a plurality of tests for determining a necessary range of values for each of said collateral quality data factors to satisfy said requirements for said preselected investment ratings category; and guiding at least one of purchases and sales of said collateral using said mathematical relationship in lieu of said matrix such that said collateralized obligation satisfies said requirements for said preselected investment ratings category.

8. The computer usable medium according to claim 7, further comprising means for testing said mathematical relationship for error, and means for optimizing results of said correlation/regression analysis by statistical fitting when an error is present.

9. The computer usable medium according to claim 8, wherein said statistical fitting is effected using at least one of a gradient descent algorithm, the Gauss-Newton algorithm, the Levenberg-Marquardt algorithm, and a probabilistic algorithm.

* * * * *